(No Model.) 4 Sheets—Sheet 1.

N. W. HARTMAN.
GLASS BLOWING MACHINE.

No. 582,158. Patented May 4, 1897.

Witnesses:
J. W. Garfield
N. J. Clemons

Inventor
Noble W. Hartman
by Chipier & Co.
Attorneys.

(No Model.)  4 Sheets—Sheet 2.

N. W. HARTMAN.
GLASS BLOWING MACHINE.

No. 582,158. Patented May 4, 1897.

Witnesses:
J. D. Garfield
N. J. Clemons

Inventor:
Noble W. Hartman,
by Chapin & Co
Attorneys.

(No Model.) 4 Sheets—Sheet 3.

N. W. HARTMAN.
GLASS BLOWING MACHINE.

No. 582,158. Patented May 4, 1897.

Witnesses:
J. W. Gorfield
H. J. Clemons

Inventor,
Noble W. Hartman,
by Chapin & Co
Attorneys.

(No Model.) 4 Sheets—Sheet 4.

N. W. HARTMAN.
GLASS BLOWING MACHINE.

No. 582,158. Patented May 4, 1897.

Witnesses:
J. D. Garfield
H. J. Clemons

Inventor
Noble W. Hartman
by Chapin & Co.
Attorneys.

UNITED STATES PATENT OFFICE.

NOBLE W. HARTMAN, OF TOLEDO, OHIO, ASSIGNOR TO THE TOLEDO GLASS COMPANY, OF SAME PLACE.

GLASS-BLOWING MACHINE.

SPECIFICATION forming part of Letters Patent No. 582,158, dated May 4, 1897.

Application filed October 29, 1896. Serial No. 610,476. (No model.)

*To all whom it may concern:*

Be it known that I, NOBLE W. HARTMAN, a citizen of the United States of America, residing at Toledo, in the county of Lucas and State of Ohio, have invented new and useful Improvements in Glass-Blowing Machines, of which the following is a specification.

This invention relates to glass-blowing machines, the object being to provide improved mechanisms for effecting the purposes of such machines and for imparting an oscillatory motion to the blow-pipe thereof; and the invention consists in the peculiar construction and arrangement of said mechanisms, all as hereinafter fully described, and more particularly pointed out in the claims.

Figure 1:
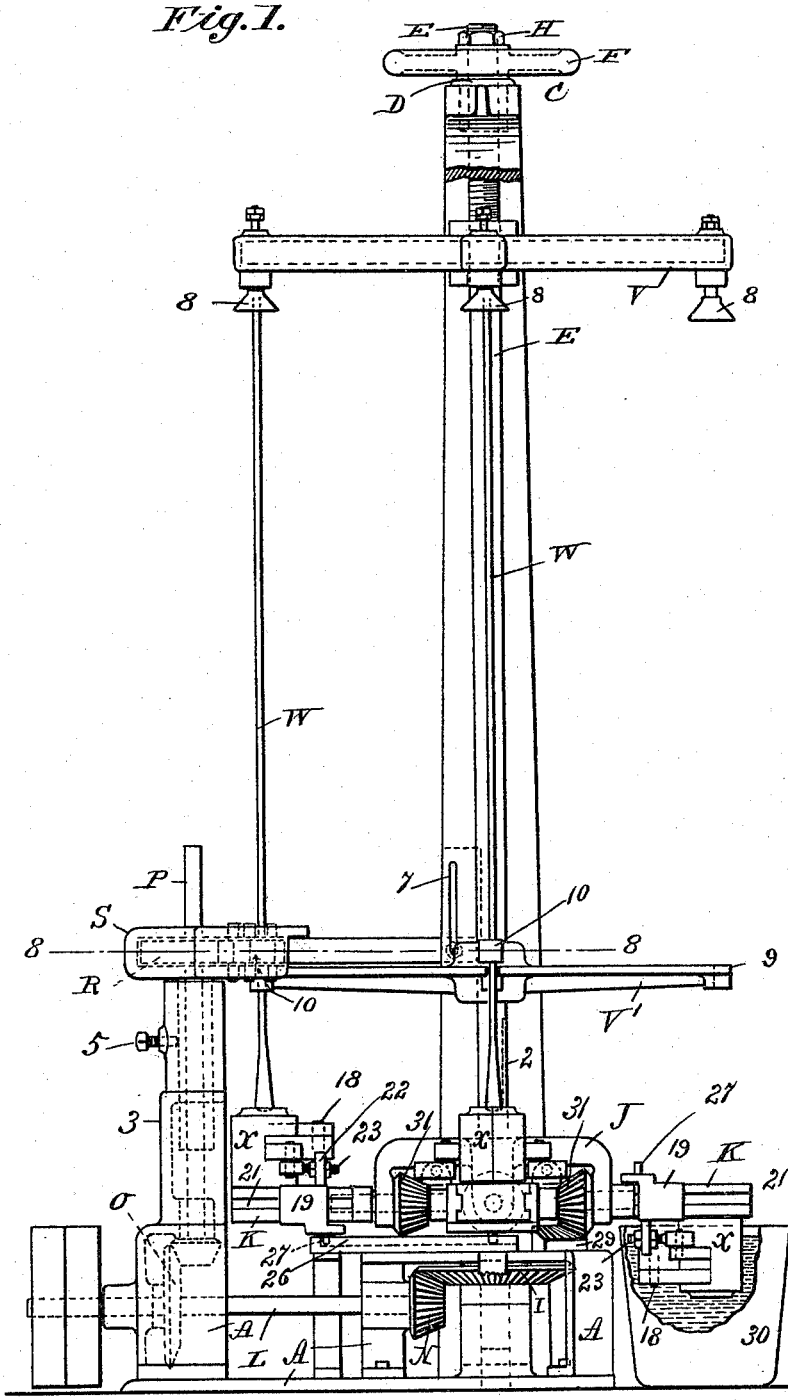
Figure 2:
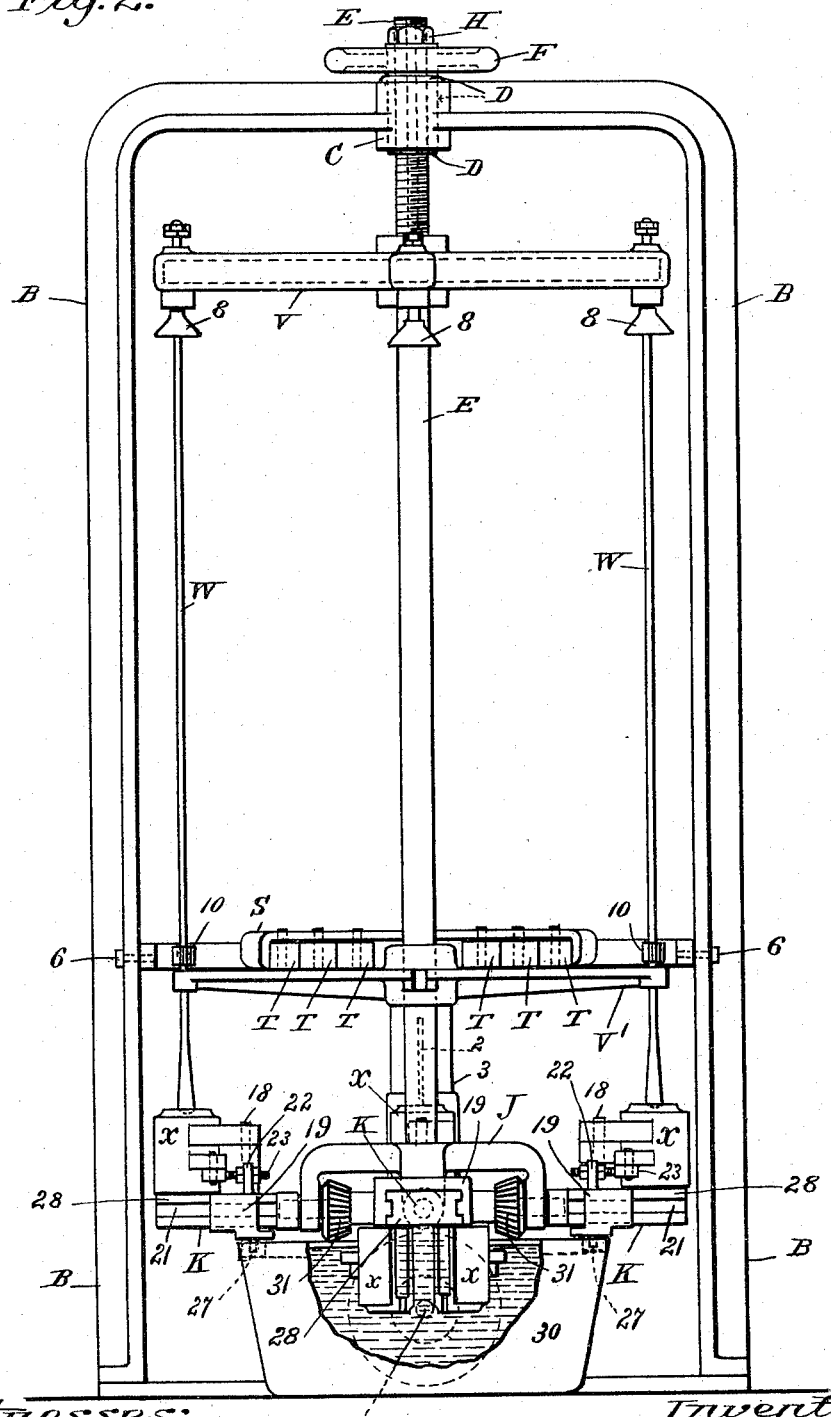
Figure 3:
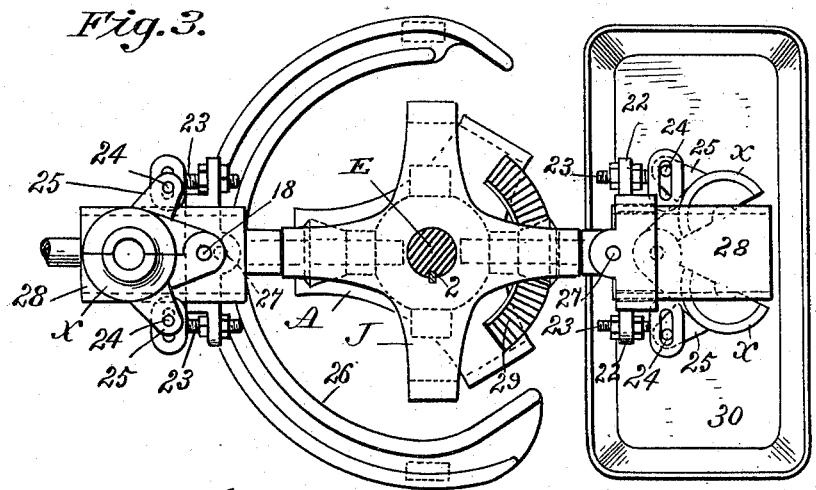
Figure 4:
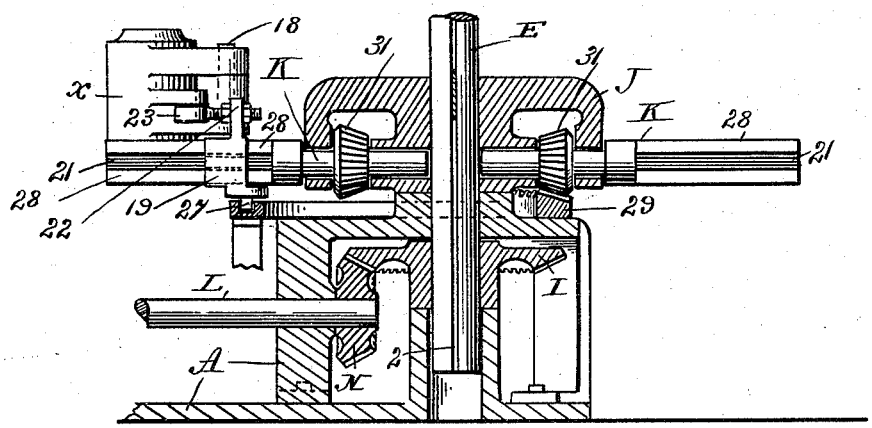
Figure 5:
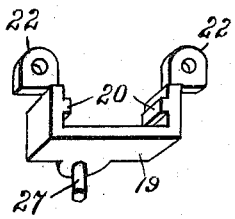
Figure 6:
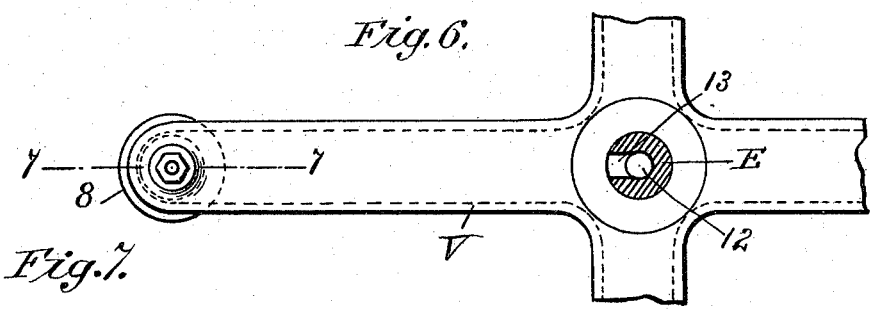
Figure 7:
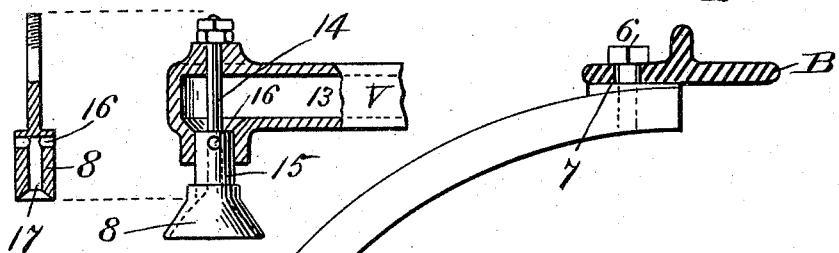
Figure 8:
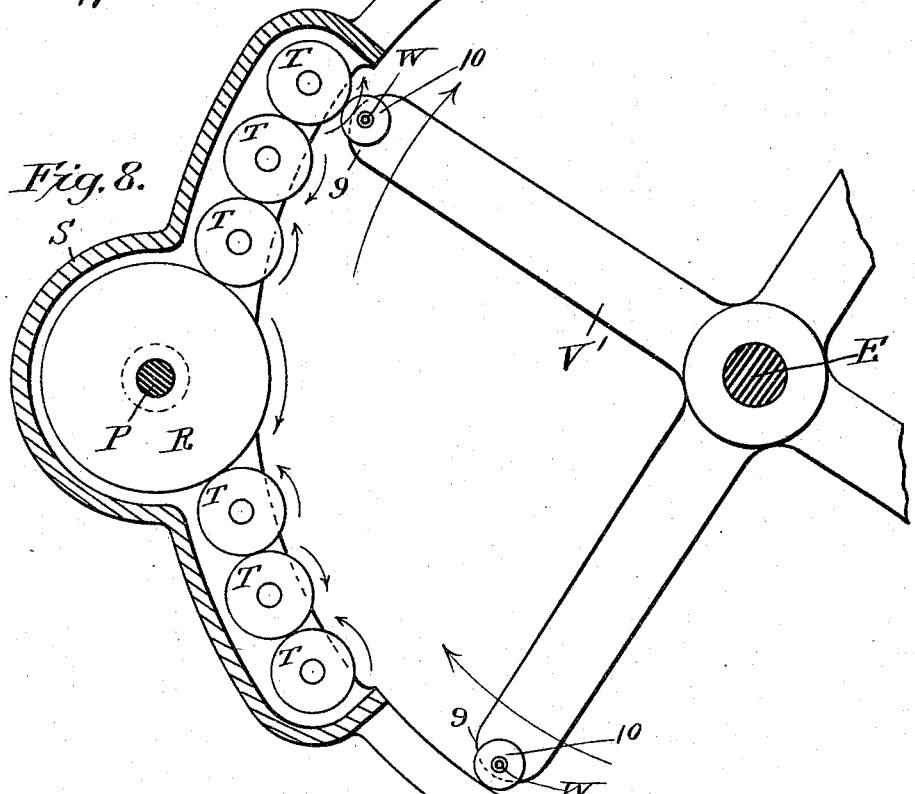

In the drawings forming part of this specification, Figure 1 is a side elevation of a glass-blowing machine embodying my invention, showing a part of the frame of the machine and one end of the mold-cooling basin broken away. Fig. 2 is a front elevation of the machine, showing the front side of said basin broken away. Fig. 3 is a plan view of the molds and portions of their supporting and operating devices and of said basin. Fig. 4 is a sectional view of the base of the machine and contiguous parts, as below described, and a side elevation of a mold, its shaft, and of the lower end of the main shaft. Fig. 5 is a perspective view of a detail part hereinafter referred to. Fig. 6 is a top plan view of a part of the upper blowpipe-supporting spider. Fig. 7 illustrates in sectional views on line 7 7, Fig. 6, detail parts hereinafter described. Fig. 8 is a sectional and a top plan view on line 8 8, Fig. 1.

In the drawings, A indicates the base of the machine, and B the frame-posts thereof. Said posts B are represented as cast integrally, but they may be otherwise made, if preferred. A hub C is provided at the upper end of said posts B, centrally located, as shown, in which is fixed a bearing-box D.
E is the main shaft, which extends from a point in the upper part of said frame above said hub C nearly to the lower side of said base A, as shown in Fig. 4. The upper end of shaft E has a coarse screw-thread formed, preferably a flat-faced one, and its screw-threaded portion extends through said bearing-box D and has a hand-wheel F thereon, above said box, which has a screw connection with said upper end of shaft E, whereby the latter and the posts below described connected therewith may be adjusted vertically. A check-nut H is applied to said shaft over said hand-wheel, whereby the latter is locked against rotary movement when said shaft rotates. The lower end of said shaft E is grooved, as shown at 2, Fig. 4, to provide for a common key connection therewith of a bevel-gear I and for the support J of the mold-supporting shafts K K.

A driving-shaft L is suitably supported in the machine, as shown in Fig. 1, and is provided with a tight and loose pulley, as there shown, to receive an ordinary driving-belt. Said shaft L has a bevel-gear N fixed thereon engaging and driving said bevel-gear I. A second bevel-gear O is fixed on said shaft L within a part of said base (see Fig. 1) and has a bevel-gear connection with the vertical shaft P, which is supported for rotation in an upright part 3 of said base A. A pulley R, inclosed partially within the pulley-case S, has a spline-and-groove engagement with the shaft P. The said pulley-case S is provided with a long sleeve 4, within which the said shaft P rotates, said long sleeve fitting within the upright part 3 and secured therein in any desired position by a set-screw 5. By means of this set-screw the pulley-case S and pulley R can be adjusted vertically to correspond to the vertical adjustment of the other parts of the machine. As said pulley R revolves in the case S, Figs. 1, 2, and 8, it rotates the several pulleys T, which have a frictional contact with each other and with said pulley R. Said pulley-case S has arms thereon extending to the said two upright frame-posts B of the machine, in which are vertical slots 7, through which bolts 6 6 pass into said arms, and thereby said pulley-case is made adjustable vertically to correspond with the said vertical adjustment of the main shaft E and the spiders V V', and consequently said pulley R is also made vertically adjustable, as above described. The said vertically-adjustable feature of the driving-shaft E provides for adjusting the lower ends of the blow-pipes W W relative to the molds X to accommodate different kinds of work, as some articles when blown require the lower end of said pipe to be nearer than others to said mold, and said pipes when in the machine are supported in said spiders, as shown, and consequently their vertical positions are governed by those of the latter. Said blowpipes W when placed in the machine, as shown in Fig. 2, have their upper ends entered into the lower end of a vertically-moving air-valve 8, and each one engages in a slot in the extremity 9 of an arm of said lower spider V'. A pulley 10 on each blowpipe serves to support the latter vertically when placed in the machine and provides a projection on said pipe for engagement with said several rotating pulleys T. By referring to Fig. 8 and noting the direction of said driving-pulley R, as indicated by the arrow adjacent to its face, it will be understood that the driven pulleys T on each side of said pulleys are caused to rotate in alternate directions, as there indicated by the several arrows thereopposite. The purpose of said series of pulleys T and means for rotating the same, as described, is to provide means for imparting an oscillating or reciprocally-rotating movement to said blowpipes and the glass thereon within the molds X, with which each of said pipes operates immediately after said molds become closed, so that the article being formed therein shall bear no trace of the joint line or lines of the mold-sections. Said joint-line is obliterated by, so to speak, wiping the surface of the article back and forth against the inner wall of the mold by said oscillating motion of the blow-iron. The said air-valve 8 is constructed, as below described, to be supported on the extremities of the hollow arms of the said spider V.

Fig. 2, which shows the machine in front elevation, illustrates the relative positions of the main shaft E, the two spiders V V', the blowpipes, and two of the molds under said blowpipes. A third mold in this figure is shown partly immersed in said basin. This figure also shows said blowpipe-rotating devices. Said shaft E has an air-passage (indicated in dotted lines) extending downwardly. In Fig. 6 said shaft and its said central air-passage 12 are clearly shown, and in Fig. 7 the end of said arm and the air-passage 13 therein, communicating with said passage 12 in shaft E. Compressed air is supplied to the air-passage in said shaft from any suitable source connected therewith by a flexible or other conduit in the usual way. Said air-valve comprises a spindle 14, having a tubular hub 15, in which are lateral and axially-arranged air-passages 16 and 17, the former communicating with the latter, a suitably-flanged hood on its lower end, as shown, to guide the end of the blowpipe to a central position opposite the lower end of said air-passage 17, and a nut or nuts, as shown, attaching said spindle to the arm of the spider. Said spindle 14 is fitted loosely in said arm, so that it will drop by gravity when the blowpipe is removed. It is shown in its dropped position in said Fig. 7, and while so held no air can enter the valve because the air-passages 16 therein are covered by the surrounding part of said arm; but when the blowpipe is engaged therewith said spindle is pushed and held upward, so that said wind-passages 16 communicate with the air-passage 13 in said spider-arm, and consequently air flows freely into and through said blowpipe to the mold X. When the blowpipe is taken out of the machine, said valve drops to the position shown in Fig. 7 and the air-flow is cut off. The said molds X consist, as usual, of two sections hinged together, as shown. The two sections of each mold are hinged on the pintle 18, and said pintle has its lower end fixed in the rectangular-formed mold-bed 28.

A yoke 19, (see Fig. 5,) having two ribs 20, slides onto the shaft K, Fig. 4, and said ribs engage in a slot 21 in the opposite sides of the said shaft K, thereby suitably engaging said yoke with said shaft, so that the latter and the mold parts which are connected to said yoke have the requisite revoluble motions, whereby the mold is carried into and out of the water contained in said basin and the mold is wet and cooled, as usual. Two bolt-lugs 22 are provided on said yoke 19, in which two bolts 23, one for each mold-section, are secured, as shown in Figs. 3 and 4. Each of said bolts 23 has a flat head with a slot in it, as clearly shown in Fig. 3, and a pin 24 in each wing 25 of the mold-sections extends through said slot, thereby completing such engagement of the hinged mold-section with the fixed bolt 23 as causes the mold to be opened and shut at regular periods when the yoke is given sliding movements on the said shaft K, consequent upon the circular movements of the mold imparted thereto by its described connection with said main shaft E. On the bed A of the machine, near the under side of said shafts K, is a circular cam 26, with which a depending pin 27 on the under side of said yoke 19 engages, and the form of said cam is such that after a mold has been immersed and rises out of the water (still moving toward one end of said cam) said pin 27 strikes a border of the cam and causes yoke 19 to slide toward the end of shaft K and swing the mold-sections together, thus closing the mold. It is well understood that after the mold rises from the water and is nearly engaged with said cam the operator places a blowpipe on the machine having molten glass thereon, which is inclosed in said mold, and that the blowing of said glass is proceeded with automatically, as above described. After the said blowing is completed, or as the mold approaches the opposite end of said cam 26, said pin 27 on yoke 19 engages another part of said cam and moves said yoke 19 toward the bed of the machine, thereby opening said mold. The operator now removes the blowpipe and the blown article from the mold, and immediately after a beveled pinion 31 on shaft K engages a circular rack-gear 29, fixed on bed A, and causes said shaft to make a full revolution, thus carrying the open mold into the water in the basin 30 and out again, as set forth. The said basin 30 is constructed apart from the bed of the machine and not in said bed, as heretofore practiced. This construction renders the cost of the bed more economical and conduces to convenience in cleaning out the basin.

Having thus described my invention, what I claim, and desire to secure by Letters Patent, is—

1. In a glass-blowing machine, in combination, a mold and a mold-support, means for imparting a movement to the mold and its support in a circular path, an air-conduit that is movable in unison with the mold, a removable blowpipe which may be temporarily placed in connection with the air-conduit and in coöperative proximity to the mold, a tubular air-valve having a free vertical movement in said conduit and having a flanged hood on its lower end, and lateral and axially-arranged air-passages therein normally closed against the escape of air therefrom, by gravity, and which is opened by the contact of said blowpipe therewith, and means for imparting a reciprocating rotary movement to the blowpipe, substantially as set forth.

2. In a glass-blowing machine, in combination, a mold and means for supporting the same, means for imparting a movement to the mold and its support in a circular path, an air-conduit that is movable in unison with the mold, a blowpipe having a pulley thereon intermediate of its extremities, which may be placed in connection with said air-conduit and in coöperative proximity to the mold, and a series of pulleys in the machine having rotary movements in opposite directions in a horizontal plane, with the peripheries of which said blowpipe-pulley is brought into contact whereby said pipe is given a reciprocating rotary movement, and means for rotating said series of pulleys, substantially as set forth.

3. In a glass-blowing machine, in combination, the base A, the main shaft E, and means for rotating the same, the horizontal shaft K, having gear 31, thereon, and means for supporting the same for rotary motion and for connecting the same with said main shaft, whereby it is carried around in a horizontal plane above said base, the circular cam 26, fixed on said base, the sectional mold carried on shaft K, having a part connected therewith engaging with said cam whereby the mold is opened and closed while moving, the segmental circular rack 29, also fixed on said base for engagement with said gear 31, whereby said shaft K, is rotated intermittently and the mold thereon is caused to be immersed in, and withdrawn from, a cooling liquid, substantially as set forth.

4. In a glass-blowing machine, in combination, a mold and means for supporting the same, means for imparting a movement to the mold and its support in a circular path, an air-conduit that is movable in unison with the mold, a blowpipe having a vertically-adjustable pulley thereon intermediate of its extremities, which may be placed in connection with said air-conduit and in coöperative proximity to the mold, and a series of vertically-adjustable pulleys in the machine having rotary movements in opposite directions in a horizontal plane with the peripheries of which said blowpipe-pulley is brought into contact whereby said pipe is given a reciprocating rotary movement, and means for rotating said series of pulleys, substantially as set forth.

NOBLE W. HARTMAN.

Witnesses:
ALONZO HALL,
ALMON HALL.